US009830772B2

(12) United States Patent
Reaves et al.

(10) Patent No.: US 9,830,772 B2
(45) Date of Patent: Nov. 28, 2017

(54) DYNAMIC DEPOSITS AND PROMOTIONS FOR GAMING SYSTEMS

(71) Applicant: Mobile Gaming Technologies, Inc., San Jose, CA (US)

(72) Inventors: Michael Reaves, Orinda, CA (US); George Weinberg, Daly City, CA (US)

(73) Assignee: Mobile Gaming Technologies, Inc., Oakland, CA (US)

( * ) Notice: Subject to any disclaimer, the term of this patent is extended or adjusted under 35 U.S.C. 154(b) by 461 days.

(21) Appl. No.: 14/245,975

(22) Filed: Apr. 4, 2014

(65) Prior Publication Data

US 2015/0287280 A1 Oct. 8, 2015

(51) Int. Cl.
*G06F 17/00* (2006.01)
*G07F 17/32* (2006.01)

(52) U.S. Cl.
CPC .................................. *G07F 17/3244* (2013.01)

(58) Field of Classification Search
CPC .................................................. G07F 17/3244
See application file for complete search history.

(56) References Cited

U.S. PATENT DOCUMENTS 6,012,144 A 1/2000 Pickett
6,088,683 A 7/2000 Jalili
6,748,367 B1 6/2004 Lee
6,882,979 B1 4/2005 Reay
8,645,271 B2 2/2014 Remy
2008/0299970 A1 12/2008 Roberts
2009/0125340 A1 5/2009 Gosney
2011/0201408 A1* 8/2011 Gagner ................ G06Q 20/04 463/25
2011/0251949 A1* 10/2011 Kay ...................... G06Q 20/10 705/39
2012/0259685 A1* 10/2012 Gardner ................ G06Q 20/12 705/14.17

(Continued)

OTHER PUBLICATIONS

Ip, Rp, Experience and First Win Bonus. myloljournal.waordpress. com. Online. Feb. 29, 2012. Accessed via the Internet. Accessed Jun. 12, 2016. <URL: https://myloljournal.wordpress.com/2012/02/29/ip-rp-experience-and-first-win-bonus/>.*

(Continued)

*Primary Examiner* — Dmitry Suhol
*Assistant Examiner* — Carl V Larsen

(57) ABSTRACT

An electronic wager based gaming system includes one or more communication devices, a game administration server component, and a player account server component. The game administration server component administers wager based game play and communicates results thereof. The player account server component facilitates the deposit of monetary funds by the player into a player account, which can be done by providing to the player a display having a plurality of deposit buttons of different monetary amounts that can be selected. The customized deposit button amounts can be based on previous deposit amounts, deposit history, game play patterns, types of games played, betting limits, bonus acceptance history, and the like. At least one deposit button amount can reflect a determination of the biggest deposit likely to be made by the player. One or more deposit buttons can have a bonus amount, if selected.

20 Claims, 6 Drawing Sheets

(56) References Cited

U.S. PATENT DOCUMENTS

| | | | | |
|---|---|---|---|---|
| 2013/0130781 | A1* | 5/2013 | Anderson | G07F 17/3255 463/25 |
| 2014/0162768 | A1* | 6/2014 | Nelson | G07F 17/32 463/25 |
| 2014/0256423 | A1* | 9/2014 | Williams | G07F 17/3241 463/29 |
| 2015/0044987 | A1 | 2/2015 | Menon | |
| 2015/0072762 | A1* | 3/2015 | Curtin | G07F 17/3251 463/25 |

OTHER PUBLICATIONS

Office Action for U.S. Appl. No. 14/558,573 dated Jan. 19, 2017.

* cited by examiner

DYNAMIC DEPOSITS AND PROMOTIONS FOR GAMING SYSTEMS

TECHNICAL FIELD

The present invention relates generally to wager based gaming systems, and more particularly to player accounting for such wager based gaming systems.

BACKGROUND

Wagering games such as blackjack, poker, baccarat, roulette, craps, bingo, keno, slot machines, and sports betting, among many others, are popular games offered in casinos and other similar establishments. These games are typically administered, maintained and monitored by human dealers and other personnel of the casino or other gaming establishment. Alternatively, or in addition, such wagering games can be played on electronic gaming machines or other computing devices, where the dealer, playing cards, chips and/or other gaming elements may be virtual or electronic.

There can be numerous advantages in providing such wagering games virtually via various types of electronic devices, whether online or over a network. Such electronic versions of games can scale rapidly for many multiples of players, which tends to require less overhead for a gaming operator. Also, many players can be more attracted by the anonymity and ease of playing in an online environment. Further, some of these online and other virtual gaming systems can be even more attractive where players are permitted to play remotely and/or on their own personal computing devices, such as their own home computers, laptops, tablet devices, cell phones and the like.

With the advent of wagering games being offered online and via other virtual means, there are various new challenges that arise. For example, legal player verification, fraud, gaming certifications, and other technical issues are all concerns that must be addressed for many online gaming systems. Further issues arise with respect to the creation and maintenance of various player accounts, including the ability for players to deposit and withdraw money from their online gaming accounts. While live players in physical casinos are able to use cash, chips, markers, physical credit cards, and the like, online players are limited in their ability to provide monetary value into their player accounts. Even where a player has taken the time to register an account and associate a credit card therewith, the process of depositing more money into the account when needed can often be cumbersome and annoying. Where too many steps or too much inconvenience is encountered by a player trying to deposit money, the player may decide not to play this time or possibly ever on such a system. The opportunity for the player to play and for the operator to provide services to that player can thus be lost.

While electronic wagering gaming devices and systems therefor have worked well in practice over many years, there is always a desire for improvement. To that end, it would be desirable to have improved electronic wagering gaming systems that allow for remote gaming and game account management by players, and in particular for such systems to be able to provide a more user friendly and dynamic process to deposit money into player accounts.

SUMMARY

It is an advantage of the present disclosure to provide improved electronic wagering gaming systems that include a more user friendly and dynamic process to deposit money into player accounts. This can be accomplished at least in part by providing a player with a plurality of deposit buttons of different monetary amounts during a deposit process, wherein at least one of the deposit button monetary amounts is customized to the player. Such a provision of deposit buttons can be made by way of a graphical user interface on a display to the player, for example.

In various embodiments of the present disclosure, an electronic gaming system adapted to provide games involving wagers, game play based on the wagers, and monetary awards based on the results of the game play can include one or more communication devices adapted to facilitate gaming system communications to a display for a player, and also a game administration server component and a player account server component that are both coupled to the communication device(s). The game administration server component can be adapted to administer the play of wager based games and to communicate results of the wager based games to the player via the communication device(s). The player account server component can be adapted to facilitate the deposit of monetary funds by the player into a player account. Such a deposit function can include providing to the player a display having a plurality of deposit buttons of different monetary amounts that can be selected, wherein the amount on at least one of the plurality of deposit amount buttons is customized to the player based upon a plurality of factors.

Various detailed embodiments can include one or more additional features, either alone or in any combination. Such additional features can include, for example, a limitation where the player may only deposit monetary funds in an amount provided by one of the plurality of deposit amount buttons. Also, one or more of the plurality of deposit amount buttons can provide a bonus to the player if selected. In some embodiments, the bonus to the player can be related to the deposit amount on the button. Various factors that can be used to customize one or more button amounts to the player can include previous deposit amounts by the player, deposit history of the player, pattern of game play by the player, types of games that the player typically plays, the game most recently played by the player, betting limits of recent games played by the player, bonus acceptance history by the player, and maximum deposit amounts permitted per transaction or relevant time period, among other possible factors.

In various embodiments, one customized deposit amount buttons can provide an amount that reflects a determination of the biggest deposit that the player is likely to make at that time. Such a determination can be automated based upon one or more of the plurality of factors. A second button of the customized deposit amount buttons can provide an amount higher than the amount of the first button, a third button can provide an amount higher than the amount of the second button, and a fourth button can provide an amount higher than the amount of the third button. In some embodiments, one or more buttons can provide no bonus to player, while one or more other buttons do provide a bonus to the player. Also, at least one of the customized deposit amount buttons can possibly provide an amount that has never before been deposited by the player. Further, the display for the player can be on a separate third party electronic device provided by the player that is in communication with said one or more communication devices, such as, for example, a smart phone.

In further embodiments, various methods of facilitating a monetary deposit from a player on an electronic wager based gaming system are provided. Pertinent process steps can include detecting an input from the player requesting a deposit of monetary funds, accessing data regarding past transactions by the player, calculating one or more customized deposit amounts based on the accessed data, providing a monetary deposit display having deposit amount buttons to the player, accepting a selection of a customized deposit amount button, and depositing monetary funds into an account of the player based upon the selected button. Additional process steps can include determining a bonus amount related to one of the customized deposit amounts, showing the bonus amount on the deposit amount button having the customized deposit amount, and awarding the bonus to the player when the customized deposit amount button is selected.

Again, at least one of the deposit amount buttons can provide a calculated customized deposit amount. Also, it can be required that the player may only deposit monetary funds in an amount provided by one of the plurality of deposit amount buttons. In addition, the calculating step can include using accessed data that can involve previous deposit amounts by the player, deposit history of the player, pattern of game play by the player, types of games that the player typically plays, the game most recently played by the player, betting limits of recent games played by the player, bonus acceptance history by the player, and maximum deposit amounts permitted per transaction or relevant time period, among other possible factors. Further, one of the customized deposit amounts can reflect a determination of the biggest deposit that the player is likely to make at that time.

In still further embodiments, a computer readable medium can include at least computer program code for facilitating a monetary deposit to a player gaming account. The computer readable medium can include computer program code for: detecting an input from a player requesting a deposit of monetary funds, accessing data regarding past transactions by the player, calculating one or more customized deposit amounts based on the accessed data, providing a monetary deposit display having deposit amount buttons to the player, accepting a selection of a customized deposit amount button, and depositing monetary funds into an account of the player based upon the selected button. Various other computer codes, functions, and features can also be provided alone or in any combination, such as any of the functions or features set forth above in other embodiments.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed dynamic deposits for gaming systems. These drawings in no way limit any changes in form and detail that may be made to the disclosure by one skilled in the art without departing from the spirit and scope of the disclosure.

DETAILED DESCRIPTION

Figure 1:
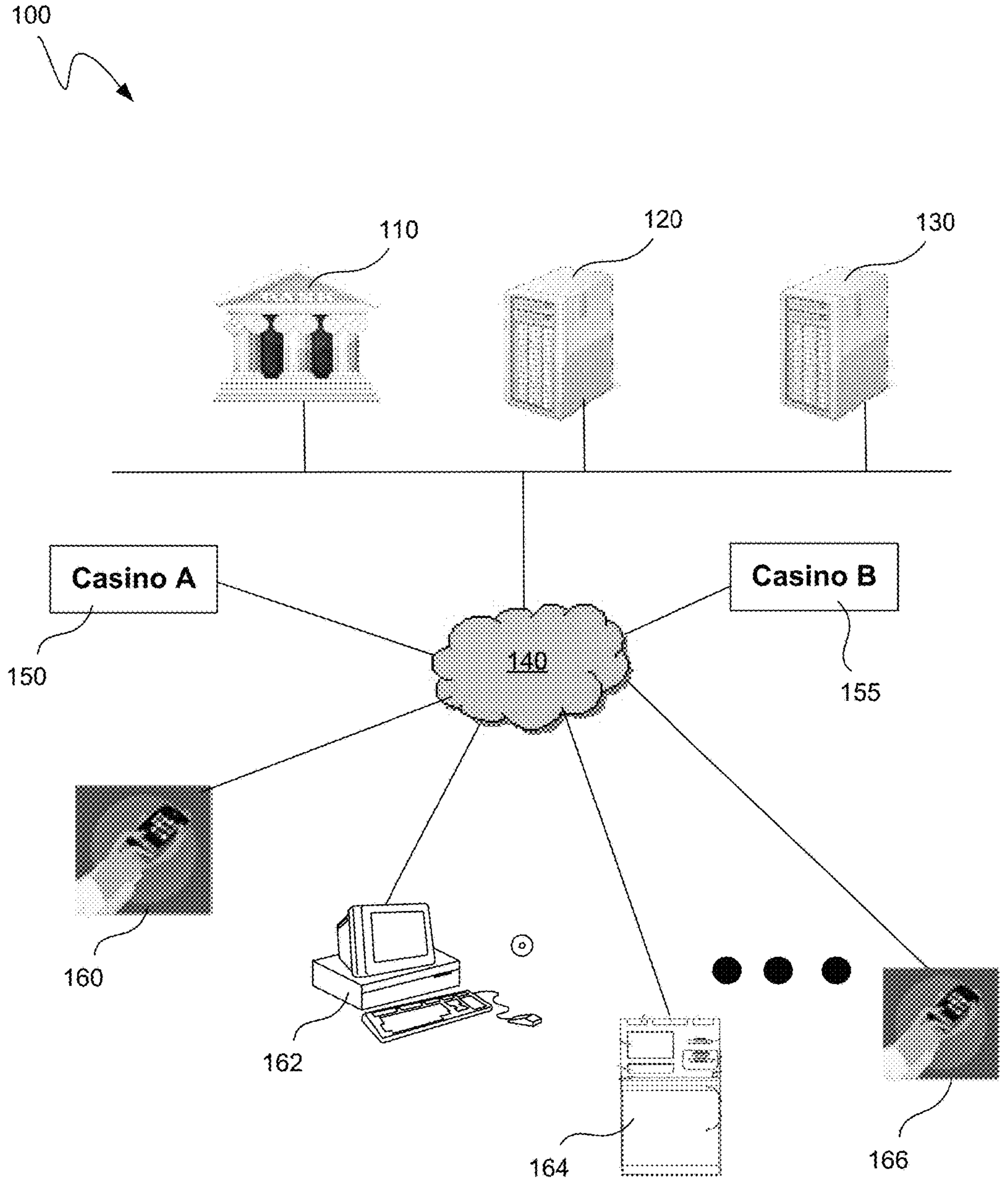
FIG. 1 illustrates in block diagram format an exemplary gaming system network adapted for the play of wager based games according to one embodiment of the present disclosure.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to devices, systems and methods for providing, conducting and facilitating the deposit of monetary funds into player accounts for the play of wagering games on and/or with the use of electronic devices and computing systems. As such, this disclosure may be applied to any type of wagering game or event, such as table games, slot machines, sports wagering, and the like. Game types can include, for example, slot machines, sports wagers, baccarat, blackjack, roulette, craps, pai gow, sic bo, poker, bingo, keno, card games, and the like, among many other possibilities. The various embodiments disclosed herein can be applied with respect to virtual games played entirely electronically, as well as live games or events, which can include physical slot machines, gaming tables, keno and bingo boards and items, sporting events, and the like.

The present disclosure contemplates having a graphical user interface ("GUI") or other suitable display on an appropriate electronic or computing device, with such an interface or display operating to facilitate the deposit of monetary funds into a player account. Such a GUI or other display presentation can include the provision of a plurality of deposit amount buttons to a player, such that the player can choose from a number of different deposit amounts quickly and easily. The present disclosure is adapted operate within a greater network of components, which can include one or more financial institutions, as well as gaming establishment servers and a plurality of player terminal devices. The player terminal devices can be provided on electronic or computing items provided by casinos or other gaming establishments, and can also take the form of third party computing devices, such as personal computers, smart phones, tablets, laptops, and the like. As such, applications and other software components can be provided to run on the various player terminals wherever they are provided.

In general, the player or gaming terminals may involve any platform capable of receiving and transmitting data, including "thin-client" platforms or platforms which do not process game play data and "smart" platforms or platforms which process game play data. The gaming terminal may be stationary, similar to the slot machines or electronic tables commonly seen at the physical casino, or portable electronic devices such as smart phones, computer tablets, portable media players, laptop computers, desktop computers, smart TV, smart glasses, and the like. Additionally, the respective gaming network can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. Such a network can be a close proprietary LAN or WAN, or can be over the Internet generally. Thus, players interested in participating in wager based gaming are not confined to a physical gaming table, slot machine, or anywhere on an actual casino floor.

Referring first to FIG. 1, an exemplary gaming system network adapted for the play of wager based games is presented in block diagram format. Wide area system or network 100 can include a variety of components and items, such as a bank 110, one or more gaming servers 120, and a financial clearinghouse 130. A cloud 140 or network can couple these items to various casinos 150, 155, individual player terminals 160-166, and other distributed components. One or more personal devices such as smart phones 160, 166 and/or personal computers 162 can serve as on site or remote player terminals in some embodiments. Various casino or other gaming establishment provided player terminals or kiosks 164 may also be provided.

Bank 110 can be contacted to verify and authenticate the deposit of actual funds into player accounts, which can be facilitated by the one or more gaming servers 120. Such gaming servers can include multiple server components, as set forth below. One or more communication devices can couple the server(s) for communications over cloud 140, which can be the Internet or any other suitable network. The financial clearinghouse ("FCH") 130 can be a centralized entity that keeps track of gaming wagers across multiple remote terminals. The FCH received information regarding player account balances, wagers, game results, and the like, and settles all accounts by crediting or debiting them as may be appropriate.

In various embodiments, one or more remote servers 120 can be adapted to administer some or all of the gaming functions away from the actual player terminal(s). The remote server(s) can include a game administration sever component and also a player account server component. These server components can reside on the same remote server, or can be distributed across multiple servers and/or locations, as will be readily appreciated. The game administration server or server component can have the rules of the game, and can be responsible to conduct the wager based game regardless of where the game is actually played, whether physical items are used, and whether a player is actually physically present where the game is played. This server can provide any number of functions, such as, for example, to process the game according to game rules, store the game states, keep track of game history, resolve player hands, credit or debit local player running accounts or scores, run a community display, and the like.

The player account server component can be adapted to manage the monetary fund input and output for wager based gaming accounts. As such, the player account server can operate to facilitate the deposit and withdrawal of funds into player accounts, such as might involve the use of credit cards, debit cards, e-checks, financial institutions, and the like. Other player account functions, such as establishing, modifying, monitoring, or closing player accounts, may also be handled by the player account server component. Deposits of monetary funds into player accounts can be streamlined and made more user friendly by providing a GUI or other suitable display that presents several different deposit amounts for the player to choose from. These can be provided on several different one-touch buttons, for example, such as that which is set forth in greater detail below.

As will be readily appreciated, programs set to run on the remote or other backend servers and server components, as well as programs set to run on the various different player terminals, can all involve the use of software or code that is specially programmed to accomplish the various features and results set forth herein. Some of the various functions can include the provision of deposit amount buttons to a player during the deposit process, which can be done at a player terminal being used by the player. Again, such a player terminal can be a number of different things at a number of different locations, and can include any electronic or computing device that is suitable to operate for the player as a gaming terminal.

During a typical process involving a deposit of monetary funds, money is transferred from one account to another electronically. This can involve the use of actual funds from a player banking account or other financial institution, monetary credit against a credit card or other legally regulated credit account, or any other suitable way where actual monetary funds are deducted, debited or credited against the player from some other location. Such funds are then credited to the player on the player account for gaming on the appropriate gaming network or system. Ordinarily, such a monetary funds transfer process would involve the step of a player manually entering a numerical amount for the amount of funds that are to be transferred. Such a step can be relatively time consuming, inconvenient, and cumbersome, such as where a player must use a 10-key numerical pad to enter several exact numerical keystrokes. Any mistakes or typos can then involve extra steps or inconvenience to the player to undo or restart the process. In addition, the player must actively think on their own to arrive at an exact numerical amount for the transfer before even entering that number manually onto a keypad, which can be on a touchscreen.

This particular process can be streamlined and made much more user friendly by instead presenting the player with a number of different options for deposit amounts. At least one or more of these different possible deposit amounts can preferably be calculated to be amounts that the player would be likely to deposit, such that the player will not be forced to choose from no attractive options. Such deposit amounts can then be presented to the player as a number of different deposit amount buttons, such that one touch from the player selects and deposits the amount on the button touched. This one button touch then takes the place of the entire process involving the player actively determining a deposit amount on their own, manually entering that amount onto a keypad, verifying that the amount is correct, and then pressing enter or otherwise ending the amount determining process under a conventional electronic deposit approach.

Again, the actual deposit amounts that are preselected and presented to the player can be those that are determined to be likely selections by the player. This can be done by using a variety of considerations, including data from past player transactions, current situations, account balances, past transactions by similar players, and other possible items that may influence how much money the player might be interested in depositing at that time. Specific factors used to calculate the customized amounts presented to the player on one or more deposit buttons can include, for example, previous deposit amounts by the player, deposit history of the player, pattern of game play by the player, types of games that the player typically plays, the game most recently played by the player, betting limits of recent games played by the player, bonus acceptance history by the player, and maximum deposit amounts permitted per transaction or relevant time period, among many other possible factors that may be used.

In various embodiments, a running history is recorded for each player, such that the deposit amounts offered and selected can be kept and analyzed for future reference. In this manner, the deposit amounts provided to the player can be dynamically fine tuned over time such that more accurate deposit amount options are provided to the player over the long run. For example, where only three deposit amounts are provided in a particular GUI deposit setup, running logs of the small, medium, and large deposit amount options can be recorded, as well as the amount and type that is actually selected by the player over time. Where a player continually selects the large option, then the deposit amounts offered to that player will increase over time to reflect that trend. Similarly, where the player continually selects the small option, then the deposit amounts offered will decrease over time. Where the player often selects the medium deposit amount, then the system will know that the amounts being offered to the player are in line with the preferences for that player, and can continue to provide similar amounts, or even fine tune further the amounts that are offered for future deposits.

Of course, there can be more than three deposit amounts offered. For example, there can be four, five, or even a dozen or more deposit amount buttons that are set to deposit an exact amount to the player account when selected. Data can be retained regarding the amounts offered and selected over time under any such arrangement, such that future deposit button amounts can be adjusted to reflect player preferences and trends. In many such embodiments, the ongoing offerings, selections, recordings, and calculations of possible deposit amounts in future transactions can involve the presentation to players of deposit amounts that have never been used by the player before. Of course, other factors may also be used to calculate the amounts offered. Such factors can include player account balances, gaming limits, typical buy-in or deposit amounts for other similar players, and so forth. Another consideration can be past offers and acceptances of bonus amounts or other promotions made on one or more of the deposit buttons.

As one particular non-limiting example, where a player first uses the monetary funds deposit tool, page, or screen on a player terminal, he or she may be presented with one-touch deposit buttons in the amounts of $50, $100, and $200. If the player selects the $50 button, then the amounts offered for the next deposit might be $40, $50, and $100. However, if the player selects the $200 button, then the amounts offered for the next deposit might be $100, $200, and $500. Further adjustments can be made to the amounts offered as more data on the player is collected over time. The ability to track the player usage, and possibly offer more deposit amount buttons can make it even more likely to offer the exact amounts most suitable to the player, making this feature more user-friendly and customized, as well as streamlining the process for players and operators alike.

Figure 2:
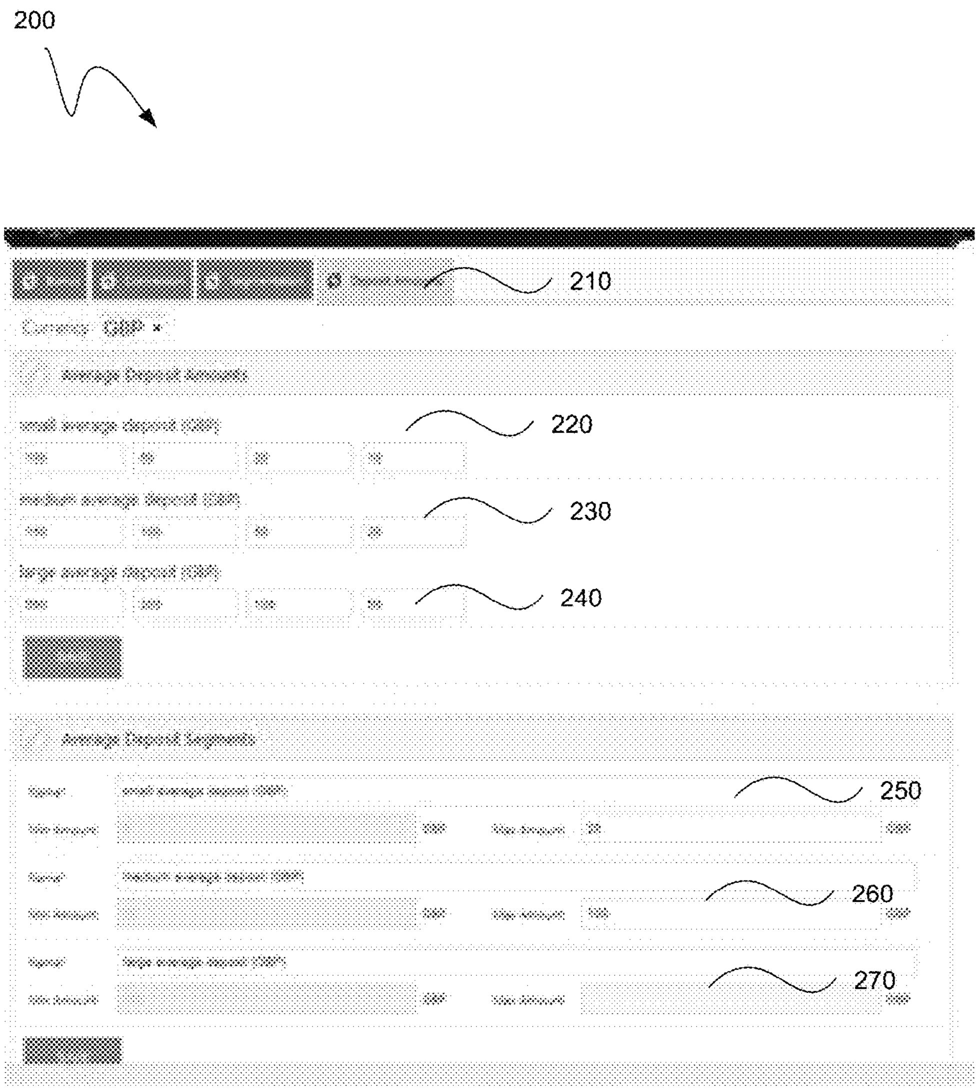
FIG. 2 illustrates an exemplary screenshot of a backend operator player account management tool according to one embodiment of the present disclosure.

Turning next to FIG. 2, an exemplary screenshot of a backend operator player account management tool is shown. Again, such a player account management tool can be provided on a player account server or server component, which can be remotely located from the player(s), and or any actual gaming location(s). Screenshot 200 depicts the presentation of historical information on a particular player. In this case, the deposit amounts tab 210 has been selected from a number of possible tabs that can be used to review player history data and other relevant factors. The currency used in this particular example is British Pounds ("GBP"), although dollars or any other currency can be used, as will be readily appreciated. Historical tracking can be made regarding the previous small deposit amounts 220, medium deposit amounts 230, and large deposit amounts 240 that have been offered to the player over time. As can be seen from this example, the player has been offered deposit amounts of (£100, 150, 500), then (50, 100, 200), then (20, 50, 100), and then (10, 20, 50), which could indicate a recent history of the player continually selecting the lowest deposit amount offered. Again, dollars or any other currency may also be used. Although only the previous four sets of deposit amounts offered can be seen here, it will be readily appreciated that the number of sets to be shown on this page can be configurable, such that more or fewer are seen. Of course, more data regarding any or all further deposit sets offered historically may also be reviewed in the system as may be desired. In addition, while only 3 different amount types (small, medium, large) have been provided for purposes of simplicity in illustration, it will be readily appreciated that more can be provided and tracked.

With each set of deposit amounts provided to players, conversion rates are tracked and conversion efficiencies are assigned. That is, the actual deposit amount selections are noted, and selections or "conversions" of small, medium, large (and/or other indicator) buttons are tracked. Where conversion rates tend toward smaller amount button selections, then smaller amounts are offered in the future. Similarly, larger amounts are offered in the future where larger amount buttons are selected. Tuning the conversion rate can then be accomplished by adjusting the amounts offered over time. The system can ideally strive for a situation where the conversion rates for all button offerings are similar, with adjustments being made in the offerings dynamically toward that end.

Various average deposit segments can also be tracked on the player account management tool. Again, in this simple example for purposes of illustration, deposit segments for small amounts 250, medium amounts 260, and large amounts 270 are provided. These deposit segments reflect a possible range for the actual deposit amounts that can be provided to the player. For example, the range for the small deposit segment 250 that could now be offered to this particular player is from 5-25, while the range for the medium deposit segment that could now be offered is from 25-100. These segment ranges can also be adjustable and recalculated over time as more data is collected. Having a on overall deposit segment range for each potential button amount offering allows the system to adjust for other factors as well. External factors such as a big holiday, big sporting event, or tax refund season might skew the actual deposit amount offerings made to the higher ends of the ranges. Conversely, other factors indicating that lower values are more appropriate now could skew the actual deposit amount offerings to the low end. Such factors could include a stock market crash, slow business or bad news day, or data indicating lower deposits being preferred by most players today.

Figure 3:
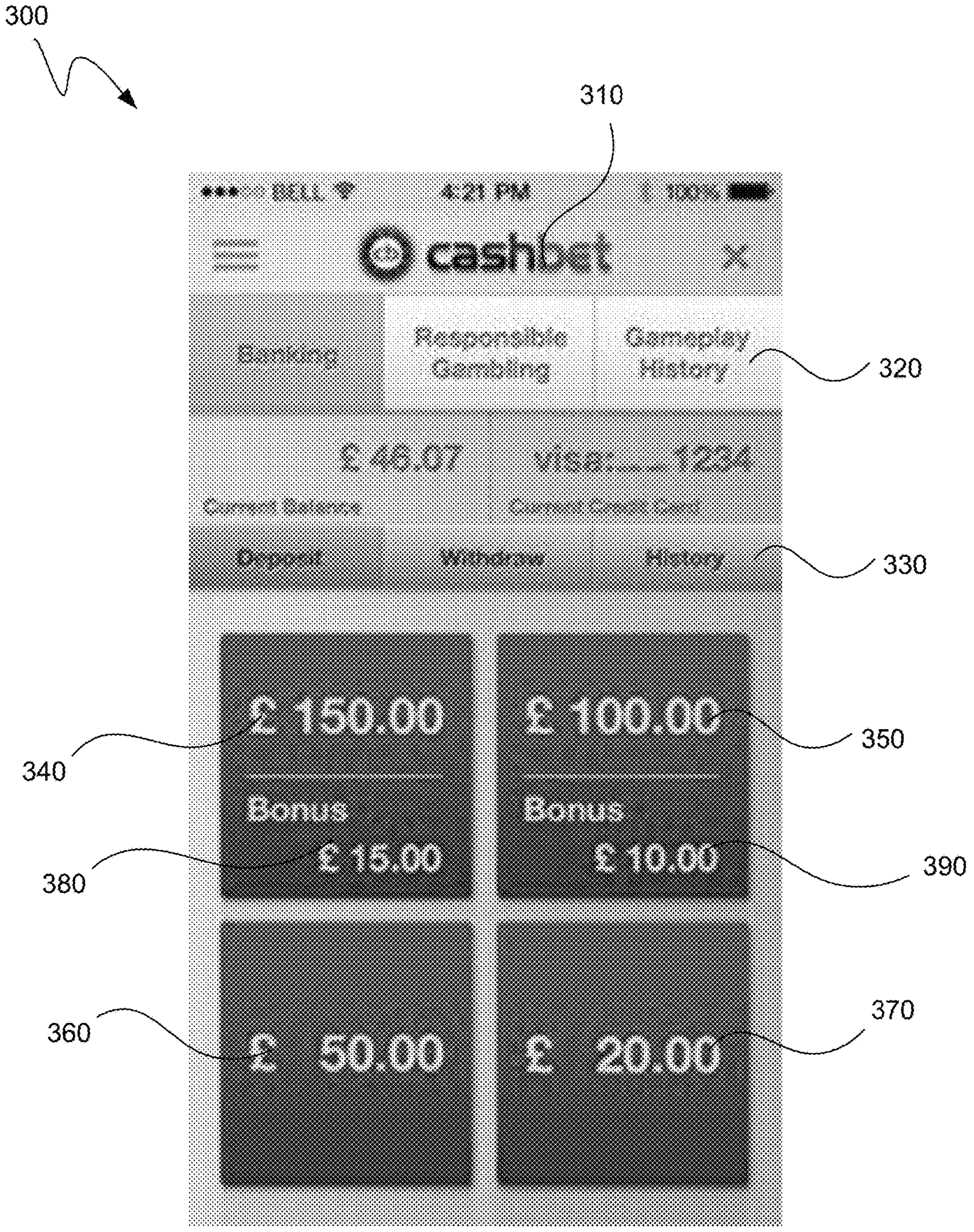
FIG. 3 illustrates an exemplary screenshot of a graphical user interface having a plurality of deposit amount buttons according to one embodiment of the present disclosure.

Continuing with FIG. 3, an exemplary screenshot of a graphical user interface having a plurality of deposit amount buttons according to one embodiment of the present disclosure is provided. While screenshot 200 depicted a tool for the backend server side of the disclosed gaming system, screenshot 300 is one example of a GUI that can be presented to a player under the current system. In this case, screenshot 300 can be that which is provided to a player on a smart phone or other similar device. As shown, an application or "app" identifier or logo 310 can be present at the top or other prominent location in screenshot 300. Such an identifier 310 can reflect that this particular gaming application or program is provided by CashBet of Oakland, Calif., for example. As part of the provided application or app, a first set of program buttons 320 can provide selections to Banking, Responsible Gaming, and Gameplay History.

As shown in screenshot 300, the system is currently in the Banking region of the overall gaming application. A current player account balance of £46.07 is indicated, as well as a particular credit card (with only a partially provided number for purposes of security). A second set of program buttons or selections 330 can provide the player with selecting whether to see a deposit page, a withdraw page, or a banking history page. In this case, the player has selected the deposit page. As shown, the deposit page can be comprised of a plurality of simple and easy one-touch deposit buttons, as noted above. In this case, four deposit buttons 340, 350, 360, 370 are provided to the player on this particular GUI. Again, this number of deposit buttons can be increased or decreased as may be desired by a given provider or system. In addition to the deposit amounts shown on each of the deposit buttons, one or more bonus amounts 380, 390 can also be provided on one or more of these buttons.

As set forth above, one or more of the deposit amounts on deposit buttons 340, 350, 360, 370 can be customized to the particular user or player. That is, the amounts provided are calculated or otherwise specifically arrived at based upon various factors relating to this user or player. In this case, the deposit amounts of £150, 100, 50, and 20 are those that have been determined to be likely to be selected by the player in this deposit process. This can be based on a number of factors, including recent deposits by the player. Again, any number of additional factors can be used to calculate the various deposit amounts that are provided to the player, and not just deposit amount history. Data on recent games being played, typical buy-ins there, information regarding other similar players, and considerations regarding holidays, sporting events, and other newsworthy items can be made with respect to factors that could influence deposit amounts.

In various embodiments, at least one of the provided deposit amount buttons can present an amount that has been calculated to be the highest amount likely to be selected by the player at that time. In this manner, the gaming operator can provide an added benefit of acquiring into a player gaming account now an amount that is likely agreeable to a player, while the player is provided with the benefit of making a single larger deposit now rather than a string of smaller deposits that might occur over a bad gaming session or series of sessions. Further factors can be used to determine the highest deposit amount likely to be selected by a player. Such factors can include, for example, the highest amount ever deposited by that player, recent high deposits by the player, recent withdrawals by the player, wins and losses by the player, as well as win-loss rates, recent games played by the player, recent transactions by similar players, and also possible bonuses or other incentives that can be provided to the player.

Such bonuses, incentives, and other promotions can take many forms. Of course, various comps and other promotional items can be provided to loyal, long term, or prolific players, as will be readily appreciated. One form of bonus can be additional funds that are provided right at the time of deposit. For example, added bonus amounts can be deposited into the player account if certain deposit amount buttons are selected. As shown in screenshot 300, one or more buttons can include such bonus amounts. For example, deposit button 340 for £150 can include a bonus 380 in the amount of £15, while deposit button 350 for £100 can include a bonus 390 in the amount of £10. In order to provide such cash bonuses or other similar incentives, some restrictions may apply so as to avoid the possibility of players depositing money and then immediately withdrawing the money and the bonus. For example, a player might not be permitted to withdraw a bonus portion from his or her account until a certain amount of time or game play for monetary amounts has taken place.

In various embodiments, the bonus portion provided on one or more of the deposit amount buttons can be related to the deposit amount. For example, only the large or largest deposit amount buttons might have an accompanying bonus amount, so as to provide an incentive to the player to deposit a larger amount from the various deposit amount selections provided. A bonus might be a percentage of the deposit amount in some cases, such as, for example, 10% of the regular deposit amount. In other embodiments, a set bonus of X amount can be given for a selection of the biggest deposit button, while a set bonus of a lesser Y amount can be given for a selection of the second biggest deposit button. Other ways of providing bonuses or promotions in association with the use of deposit buttons are also contemplated.

Again, one of the deposit buttons can be calculated to be the highest amount that the player is likely to deposit at that time. One of the factors that can be used to set that amount can include the bonus provided. For example, if the automated system takes the data, analyzes it, and comes up with a highest likely deposit amount for a player that is £141, then the system might round that value up to £150 and provide a bonus to the player as well to affect a possible selection. If the bonus is about the same as or larger than the difference, then the player may possibly select that button. Or, the system might present a deposit amount button for the exact amount calculated to be the highest likely deposit amount by the player (i.e., £141 in this example), and then also provide a bonus on top of that to the player to provide further incentive for the player to make that selection. Providing such a button to the player is beneficial to the operator in putting additional funds into possible gaming play, and is beneficial to the player in allowing the player to make fewer deposit transactions without having to deposit a higher amount that the player really does not want to deposit.

Figure 4:
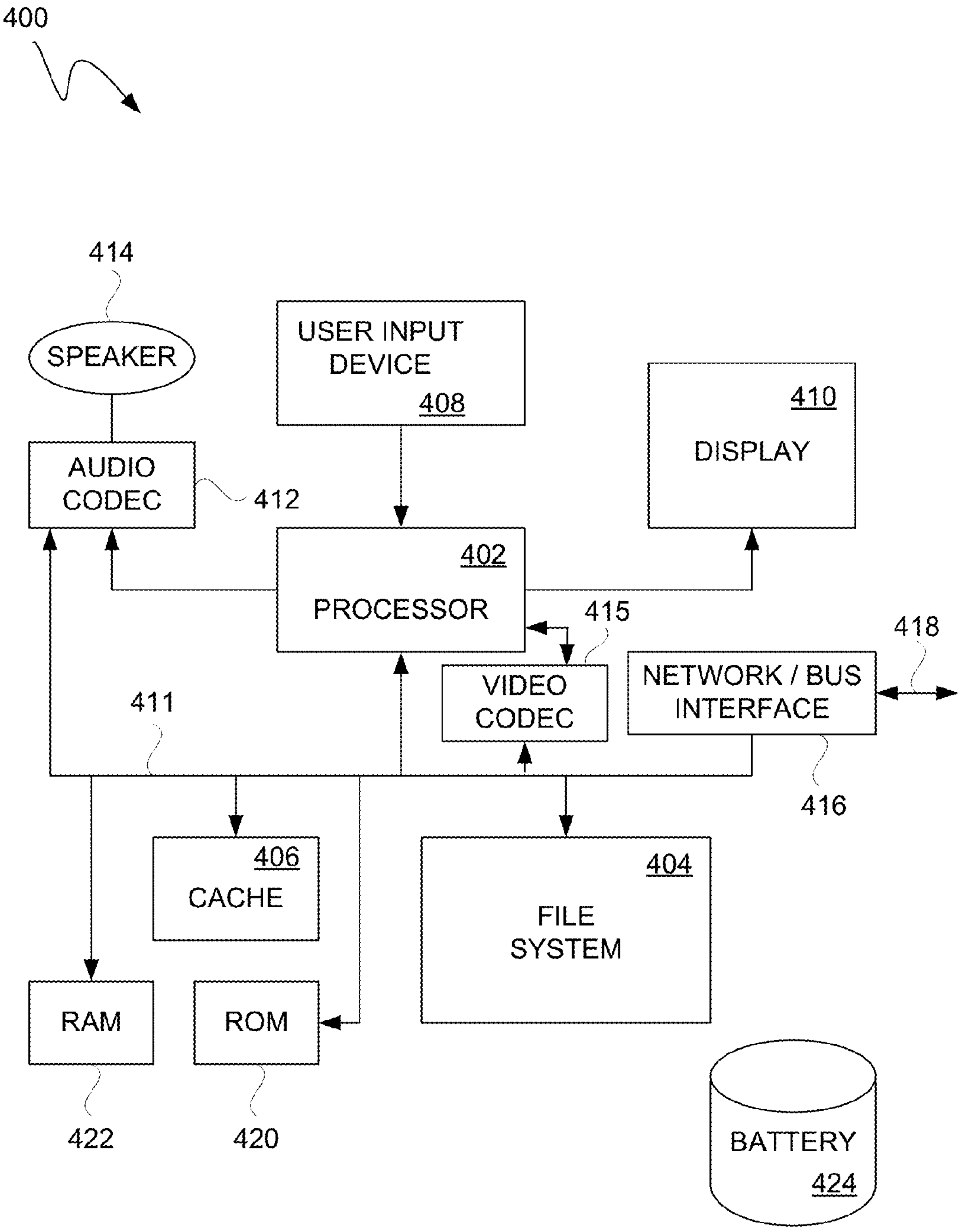
FIG. 4 illustrates in block diagram format the layout of an exemplary portable electronic device suitable for use as a player terminal according to one embodiment of the present disclosure.

While the GUI shown here has been with respect to a smart phone, it will be readily appreciated that such a GUI or similar presentation can be made on any computing or electronic device that can be used as a player terminal. Such player terminals can be owned and operated by the casino or gaming establishment, and/or can be owned and used by the players themselves or another third party. Again various embodiments can include a player terminal that can be a portable electronic device. FIG. 4 illustrates a block diagram of a portable electronic device 400 suitable for such use as a player terminal. Portable electronic device 400 can be, for example, a smart phone, portable media player, personal digital assistant, tablet computer, laptop computer, or any other electronic device suitable for running gaming applications that can include a monetary deposit function. Although device 400 depicts circuitry of a representative portable electronic device, it will be readily understood that some elements may be omitted and others may be added in other electronic devices that may be suitable to function as a player terminal.

Portable electronic device 400 can include a processor 402 that pertains to a microprocessor or controller for controlling the overall operation of the device. Device 400 can store data pertaining to various applications, programs, gaming items, functions, and transaction histories in a file system 404 and a cache 406. The file system 404 can include semiconductor memory (e.g., Flash memory) and/or one or more storage disks. File system 404 can provides high capacity storage capability for the device 400, while cache 406 can provide low capacity but high speed storage capability, as will be readily appreciated. The cache 406 is, for example, Random-Access Memory (RAM) provided by semiconductor memory. Device 400 can be powered by a battery 424, which may be rechargeable. Device 400 can also include a RAM 420 and a Read-Only Memory (ROM) 422. The ROM 422 can store programs, utilities or processes to be executed in a non-volatile manner. The RAM 420 provides volatile data storage, such as for the cache 406.

Device 400 can also include one or more user input devices 408 that allows a user of the device to interact with the device. For example, the user input device(s) 408 can take a variety of forms, such as a button, keypad, dial, touch-sensitive surface, and the like. Still further, the electronic device 400 can include a screen display 410 that can be controlled by the processor 402 to display information to the user. A data bus 411 can facilitate data transfer between at least the file system 404, the cache 406, the processor 402, an audio coder/decoder (CODEC) 412 and/or a video CODEC 415, among other components. Electronic device 400 can also include a network/bus interface 416 that couples to a data link 418 or other communication device or interface. The data link 418 allows the device 400 to couple to or otherwise communicate with another device or over a network. The data link 418 can be provided over a wired connection or a wireless connection. In the case of a wireless connection, the network/bus interface 416 can include a wireless transceiver. In some embodiments, the data link 418 can also provide power to the media player 400 (e.g., to charge the battery 424).

A portable electronic device as discussed herein may, but need not, be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels. Even smaller, and thus more portable devices, are wearable electronic devices.

Figure 5:
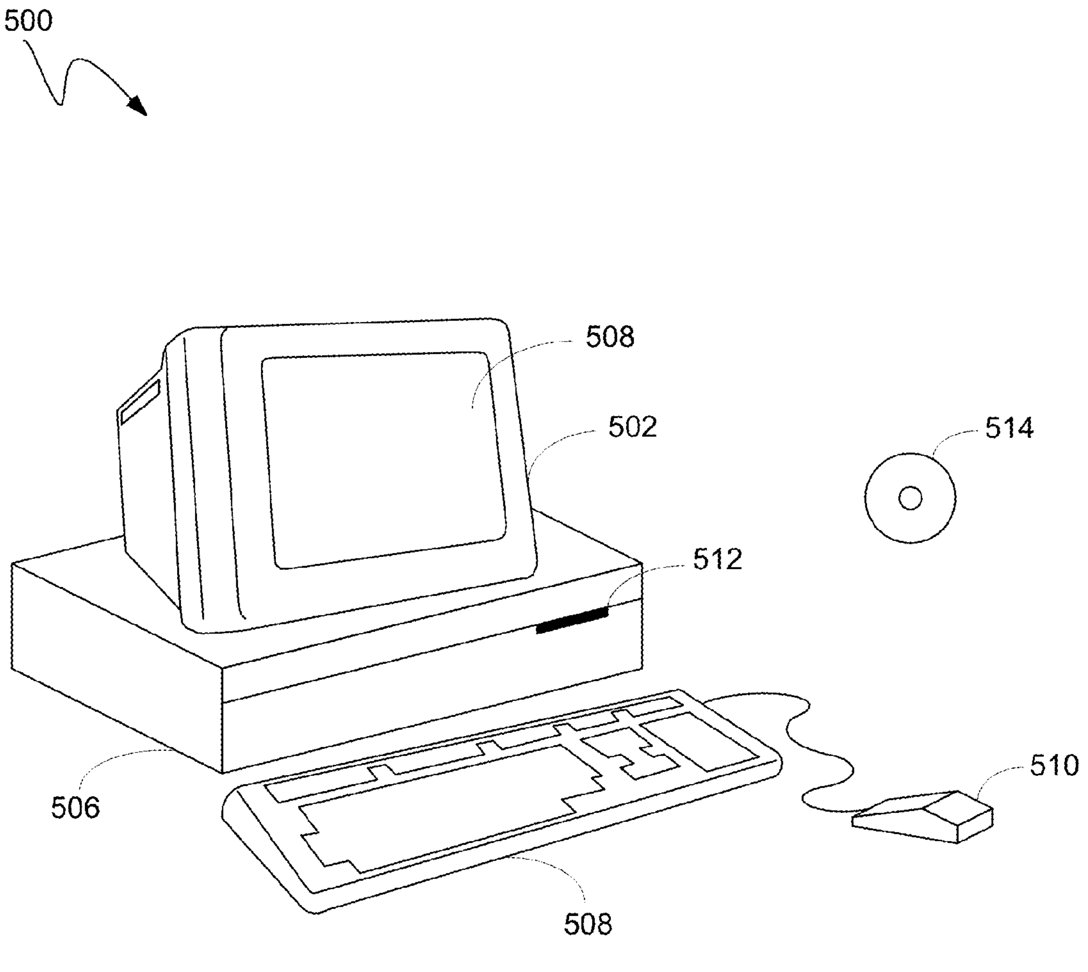
FIG. 5 illustrates in block diagram format an alternatve exemplary computer system suitable for use as a player terminal according to one embodiment of the present disclosure.

Moving next to FIG. 5, another exemplary computer system suitable for use as a player terminal is illustrated in front perspective view. Computer system 500 can be, for example, a home or office computer system adapted to communicate over the Internet or other network. Such communication can facilitate the play of wager based games and the deposit of monetary funds into player accounts by using computer system 500. Computer 500 can include, for example, a display monitor 502 having a single or multi-screen display 504 (or multiple displays), a cabinet 506, a keyboard 508, and a mouse 510. The cabinet 506 houses a drive 512, such as for receiving a CD-ROM 514, a system memory and a mass storage device (e.g., hard drive or solid-state drive) (not shown) which may be utilized to store retrievable software programs incorporating computer code that implements the embodiment of the invention, data for use with embodiment(s) of the invention, and the like. Although the CD-ROM 514 is shown as an exemplary computer readable medium, other computer readable digital video including floppy disk, tape, flash memory, system memory, and hard drive may be utilized.

Figure 6:
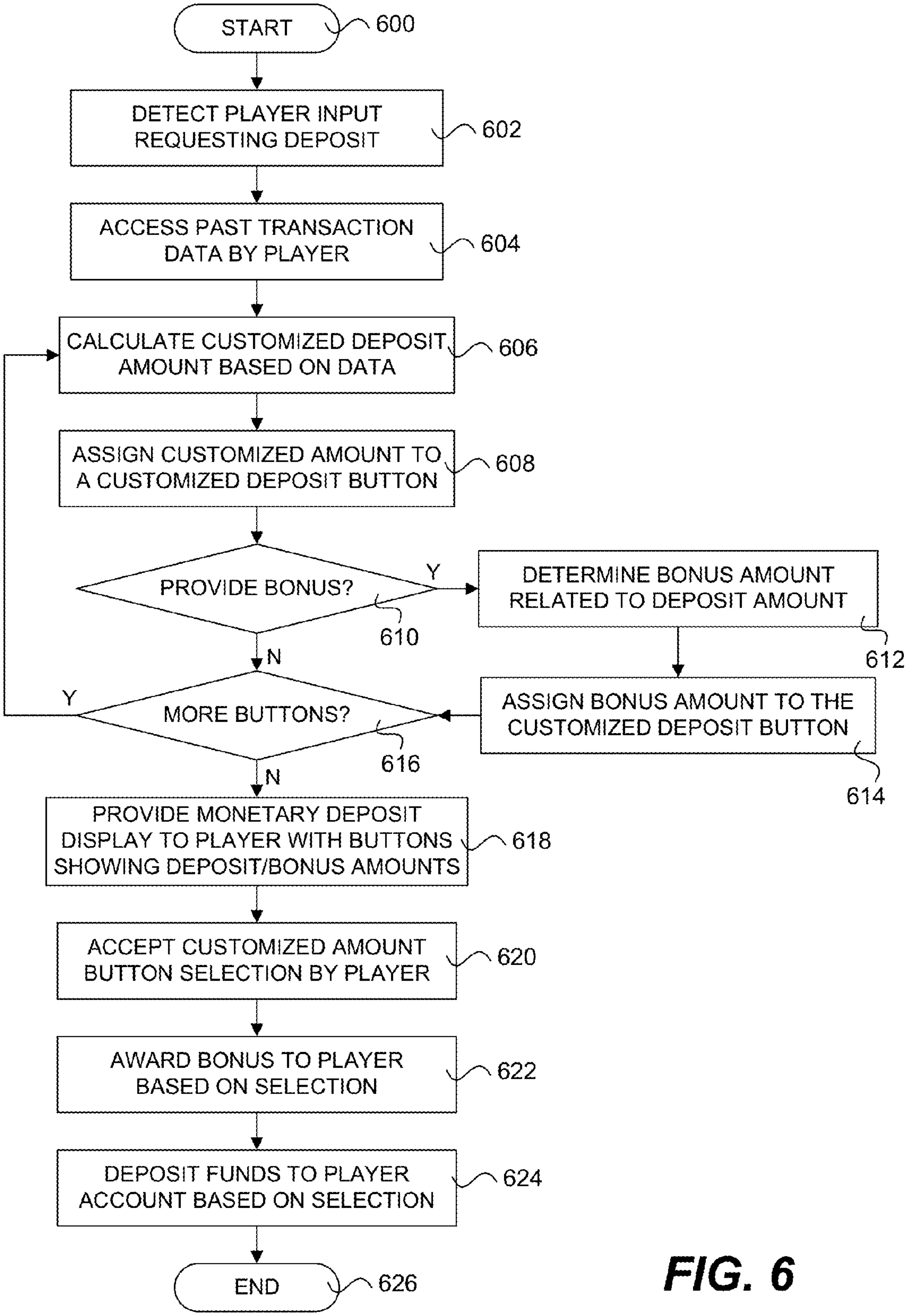
FIG. 6 illustrates a flowchart of an exemplary method of facilitating a monetary deposit from a player on an electronic wager based gaming system according to one embodiment of the present disclosure.

Moving lastly to FIG. 6, a flowchart of an exemplary method of facilitating a monetary deposit from a player on an electronic wager based gaming system is provided. After a start step 600, a player input is detected at a process step 602. Such a player input can be in indication from the player that he or she desires to make a monetary deposit to his or her player account. At a subsequent process step 604, past transactional data for the player is accessed. This can be done locally, on a backend server, at one or more other locations, or any combination thereof. Again, such transactional data can involve numerous items or factors with respect to the player and his or her history. Other data items can also be accessed as well, such as the game being played, the date and time, information regarding other players and games, and other items that might have an effect on how much money the player is likely to deposit. At the next process step 606, a customized deposit amount is calculated based on the accessed data. Again, this can involve input on a variety of factors, and the calculation can be made in a manner such as that which is set forth above.

At a following process step 608, the calculated amount is assigned to a customized deposit button to be displayed to the player. At the next decision step 610, an inquiry can then be made as to whether a bonus is to be provided for this deposit amount. If so, then the method continues to process step 612, where a bonus amount is determined. This bonus amount can be related to the deposit amount, or can be a set or standard bonus amount if desired. The bonus amount can then be assigned to the customized deposit button as well. The method then continues to decision step 616, which is also the case where no bonus is desired to be provided at step 610. An inquiry is then made at step 616 as to whether more buttons are to be provided with calculated amounts. If so, then the process reverts back to step 606, and the steps are repeated again to step 616

Once all buttons have been provided and all amounts have been calculated therefor, then the method continues to process step 618. At this step, a display is provided showing the deposit buttons with the various calculated deposit amounts and bonus amounts, as may be applicable. In some embodiments and options, no bonus amounts may be provided. At a following process step 620, a selection of a customized amount button by the player is accepted. At the next optional step 622, a bonus award is provided to the player based on the selection, if applicable. Next, funds are deposited to the player account based on the selection at process step 624. This may include the deposit of any bonus amount as well. The method then ends at end step 626.

For the foregoing flowchart, it will be readily appreciated that not every method step provided is always necessary, and that further steps not set forth herein may also be included. For example, added steps to involve additional player input may be added. Also, steps that provide more detail with respect to the customized calculations can also be included. Furthermore, the exact order of steps may be altered as desired, and some steps may be performed simultaneously. For example, step 612 may be performed before or after step 606 in various embodiments. As another example, steps 608 and 614 can be performed simultaneously or in any order. In addition, while the provided examples are with respect to dynamic deposits to a gaming account in a gaming environment, it will be readily understood that other monetary deposit or payment transactions outside of a gaming context may also be applicable.

It should be understood that the devices, systems and methods described herein may be adapted and configured to function independently or may also interact with other systems or applications, such as for example, a casino management system or player tracking system. As such, there can be various links, menus or callouts on the graphical user interface or other display that can allow the player to access other gaming or casino functions while on the deposit display. It should also be readily apparent that additional computerized or manual systems may also be employed in accordance with the disclosure in order to achieve its full implementation as a system, apparatus or method.

Those skilled in the art will readily appreciate that any of the systems and methods of the disclosure may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or various electronic platforms. In addition, the system of the disclosure may be provided at least in part on a personal computing device, such as home computer, laptop or mobile computing device, such as a smart phone, through an online communication connection or connection with the Internet. Those skilled in the art will further appreciate that the exact types of software and hardware used are not vital to the full implementation of the methods of the disclosure so long as players and operators thereof are provided with useful access thereto for the purposes provided herein.

The various aspects, embodiments, implementations or features of the described embodiments can be used separately or in any combination. Various aspects of the described embodiments can be implemented by software, hardware or a combination of hardware and software. Computer readable medium can be any data storage device that can store data which can thereafter be read by a computer system. Examples of computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An electronic gaming system adapted to provide games involving wagers, game play based on the wagers, monetary awards based on the results of the game play, and communicate with one or more communication devices adapted to facilitate gaming system communications to a display for a player, the electronic gaming system comprising:

a game administration server component coupled to communicate with said one or more communication devices, wherein said game administration server component is adapted to administer the play of wager based games and to communicate results of the wager based games to the player via said one or more communication devices; and a player account server component coupled to communicate with said one or more communication devices and said game administration server component, wherein said player account server component is adapted to facilitate electronic deposit of monetary funds by the player into a player account, wherein the deposit of monetary funds includes providing to the player a display having a plurality of deposit amount buttons of different monetary amounts that can be selected, and wherein at least one of the plurality of deposit amount buttons has an associated monetary amount depicted thereon which is customized to the player based upon one or more of a plurality of factors, and wherein a bonus amount for the at least one of the plurality of deposit amount buttons is determined at least in part on the associated monetary amount for the at least one of the plurality of deposit amount buttons, and wherein the bonus amount as well as the deposit amount are depicted on the at least one of the plurality of deposit amount buttons, wherein one or more of the plurality of deposit amount buttons provides a bonus amount to the player if selected, the bonus amount being a monetary amount, and wherein at least one of the plurality of factors is selected from the group consisting of: pattern of game play by the player, types of games that the player typically plays, the game most recently played by the player, betting limits of recent games played by the player, bonus acceptance history by the player, and maximum deposit amounts permitted per transaction or relevant time period.

2. The electronic gaming system of claim 1, wherein the player may only deposit monetary funds in an amount provided by one of the plurality of deposit amount buttons.

3. The electronic gaming system of claim 1, wherein the bonus amount to the player is customized to the player.

4. The electronic gaming system of claim 3, wherein the bonus amount provided to the player is dependent on a deposit amount associated with the deposit amount button associated therewith.

5. The electronic gaming system of claim 1, wherein a first button of the customized deposit amount buttons provides an amount that reflects a determined deposit amount, a second button of the deposit amount buttons provides an amount higher than the amount of the first button, and a third button of the deposit amount buttons provides an amount higher than the amount of the second button.

6. The electronic gaming system of claim 1, wherein a first button of the customized deposit amount buttons provides an amount that reflects a determination of a biggest deposit that the player is likely to make.

7. The electronic gaming system of claim 6, wherein the determination is automated based upon one or more of the plurality of factors.

8. The electronic gaming system of claim 6, wherein a second button of the deposit amount buttons provides an amount higher than the amount of the first button.

9. The electronic gaming system of claim 8, wherein a third button of the deposit amount buttons provides an amount higher than the amount of the second button, and wherein a fourth button of the deposit amount buttons provides an amount higher than the amount of the third button.

10. The electronic gaming system of claim 8, wherein the first button provides no bonus to player and the second button provides a bonus to the player.

11. The electronic gaming system of claim 1, wherein at least one of the deposit amount buttons provides an amount that has never before been deposited by the player.

12. The electronic gaming system of claim 1, wherein the display for the player is on a separate third party electronic device associated with the player, wherein the separate third party electronic device is in communication with at least one of said one or more communication devices, said game administration server component or said player account server component.

13. A method of facilitating a monetary deposit from a player on an electronic wager based gaming system, the method comprising:

detecting an input from the player requesting a deposit of monetary funds;

accessing data regarding past transactions by the player;

calculating one or more customized deposit amounts based on the accessed data;

providing a monetary deposit display to the player, said monetary deposit display having a plurality of deposit amount buttons, wherein at least one of the deposit amount buttons provides at least one of the one or more customized deposit amounts;

determining a bonus amount related to at least one of the customized deposit amounts;

showing the bonus amount on the deposit amount button having the at least one of the customized deposit amounts;

accepting a selection of one of the deposit amount buttons;

electronically depositing monetary funds into an account of the player based upon the selection of one of the deposit amount buttons; and awarding the bonus amount to the player based upon the selection of one of the deposit amount buttons, the awarding of the bonus amount comprising causing monetary funds that have been awarded to be electronically deposited into the account of the player, wherein the accessed data includes at least data on types of games that the player typically plays, and wherein the calculating of the one or more customized deposit amounts calculates the one or more customized deposit amounts based on at least the data on types of games that the player typically plays.

14. The method of claim 13, wherein the awarding of the bonus to the player comprises depositing monetary funds into the account of the player in an amount denoted by the one of the plurality of deposit amount buttons being selected.

15. The method of claim 13, wherein the monetary deposit display is a display of a portable electronic device associated with the player.

16. The method of claim 13, wherein one of said customized deposit amounts reflects a determination of a biggest deposit that the player is likely to make.

17. A method of facilitating a monetary deposit from a player on an electronic wager based gaming system, the method comprising:

detecting an input from the player requesting a deposit of monetary funds;

accessing data regarding past transactions by the player;

calculating one or more customized deposit amounts based on the accessed data;

providing a monetary deposit display to the player, said monetary deposit display having a plurality of deposit amount buttons, wherein at least one of the deposit amount buttons provides at least one of the one or more customized deposit amounts;

determining a bonus amount related to at least one of the customized deposit amounts;

showing the bonus amount on the deposit amount button having the at least one of the customized deposit amounts;

accepting a selection of one of the deposit amount buttons;

electronically depositing monetary funds into an account of the player based upon the selection of one of the deposit amount buttons; and awarding the bonus amount to the player based upon the selection of one of the deposit amount buttons, the awarding of the bonus amount comprising causing monetary funds that have been awarded to be electronically deposited into the account of the player, wherein the accessed data is selected from the group consisting of: pattern of game play by the player, types of games that the player typically plays, the game most recently played by the player, betting limits of recent games played by the player, bonus acceptance history by the player, and maximum deposit amounts permitted per transaction or relevant time period.

18. A non-transitory computer readable medium including at least computer program code for facilitating a monetary deposit to a player gaming account, the computer readable medium comprising:

computer program code for detecting an input from a player requesting a deposit of monetary funds;

computer program code for accessing data regarding past transactions by the player;

computer program code for calculating one or more customized deposit amounts based on the accessed data;

computer program code for providing a monetary deposit display to the player, said monetary deposit display having a plurality of deposit amount buttons, wherein at least one of the deposit amount buttons provides at least one of the one or more customized deposit amounts;

computer program code for determining a bonus amount related to one of the customized deposit amounts;

computer program code for showing the bonus amount on the deposit amount button having the customized deposit amount, the bonus amount being shown on the monetary deposit display together with the customized deposit amount;

computer program code for accepting a selection of one of the deposit amount buttons;

computer program code for electronically depositing monetary funds into an account of the player based upon the selection of one of the deposit amount buttons; and computer program code for awarding the bonus amount to the player based upon the selection of one of the deposit amount buttons, the bonus amount being monetary funds that when awarded are electronically deposited into the account of the player, wherein the accessed data includes at least data on types of games that the player typically plays, and wherein the computer program code for calculating the one or more customized deposit amounts calculates the one or more customized deposit amounts based on at least the data on types of games that the player typically plays.

19. The non-transitory computer readable medium of claim 18, wherein the monetary deposit display is a display of a portable electronic device associated with the player.

20. A non-transitory computer readable medium including at least computer program code for facilitating a monetary deposit to a player gaming account, the computer readable medium comprising:

computer program code for detecting an input from a player requesting a deposit of monetary funds:

computer program code for accessing data regarding past transactions by the player;

computer program code for calculating one or more customized deposit amounts based on the accessed data;

computer program code for providing a monetary deposit display to the player, said monetary deposit display having a plurality of deposit amount buttons, wherein at least one of the deposit amount buttons provides at least one of the one or more customized deposit amounts;

computer program code for determining a bonus amount related to one of the customized deposit amounts;

computer program code for showing the bonus amount on the deposit amount button having the customized deposit amount, the bonus amount being shown on the monetary deposit display together with the customized deposit amount;

computer program code for accepting a selection of one of the deposit amount buttons;

computer program code for electronically depositing monetary funds into an account of the player based upon the selection of one of the deposit amount buttons; and computer program code for awarding the bonus amount to the player based upon the selection of one of the deposit amount buttons, the bonus amount being monetary funds that when awarded are electronically deposited into the account of the player, wherein the accessed data is selected from the group consisting of: pattern of game play by the player, types of games that the player typically plays, the game most recently played by the player, betting limits of recent games played by the player, bonus acceptance history by the player, and maximum deposit amounts permitted per transaction or relevant time period.

* * * * *